United States Patent
Paris et al.

(10) Patent No.: US 11,136,089 B2
(45) Date of Patent: Oct. 5, 2021

(54) TRANSFORMING ELECTRIC SCOOTER HAVING A STAND-ON CONFIGURATION AND A RIDE-ON CONFIGURATION

(71) Applicant: MGA Entertainment, Inc., Van Nuys, CA (US)

(72) Inventors: Jeffrey Paris, Los Angeles, CA (US); Alejandro Keossian, Granada Hills, CA (US)

(73) Assignee: MGA Entertainment, Inc., Van Nuys, CA (US)

( * ) Notice: Subject to any disclaimer, the term of this patent is extended or adjusted under 35 U.S.C. 154(b) by 192 days.

(21) Appl. No.: 16/365,376

(22) Filed: Mar. 26, 2019

(65) Prior Publication Data

US 2020/0307735 A1    Oct. 1, 2020

(51) Int. Cl.

| | |
|---|---|
| *B62K 13/08* | (2006.01) |
| *B62K 15/00* | (2006.01) |
| *B62J 1/02* | (2006.01) |
| *B60K 1/00* | (2006.01) |
| *B62J 43/00* | (2020.01) |

(52) U.S. Cl.
CPC ............... *B62K 13/08* (2013.01); *B62J 1/02* (2013.01); *B62K 15/008* (2013.01); *B60K 1/00* (2013.01); *B62J 43/00* (2020.02); *B62K 2204/00* (2013.01)

(58) Field of Classification Search
CPC .. B62K 2202/00; B62K 21/22; B62K 15/008; B62K 13/08; B62D 51/02; B60Y 2200/126; B62J 1/08; B62J 1/04
USPC .......................... 180/209, 208; 280/7.1, 7.11
See application file for complete search history.

(56) References Cited

U.S. PATENT DOCUMENTS

| | | |
|---|---|---|
| 1,379,305 A | 5/1921 | Johns |
| 2,439,556 A | 4/1948 | Bancroft |
| 4,079,957 A | 11/1978 | Blease |
| 6,089,586 A | 7/2000 | Rudell et al. |
| 6,378,642 B1 | 4/2002 | Sutton |

(Continued)

OTHER PUBLICATIONS

Swagron K2 Toddler 3 Wheel Scooter & Ride-On Balance Trike, retrieved from https://www.amazon.com/Toddler-Scooter-Balance-Adjustable-Transforms/dp/B076437M4M on Jan. 7, 2018. This product can also be seen at https://swagtron.com/product/k2-toddler-scooter-cubs/.

(Continued)

*Primary Examiner* — Kevin Hurley
*Assistant Examiner* — Hosam Shabara
(74) *Attorney, Agent, or Firm* — Hansen IP Law PLLC

(57) ABSTRACT

An electric transformable scooter that can transform between a stand-on configuration and a ride-on configuration. The scooter has a fixed frame member at the front to which the front wheel and handlebar are mounted, and movable frame member that extends between the rear wheel and the fixed frame member. The front end of the movable frame member slides or otherwise adjusts to either a lower position or an upper position on the fixed frame member. When the movable frame member is at the lower position and locked thereat, it is generally horizontal, and its top surface defines a stand-on floorboard for stand-on operation. When the movable frame member is slid to its upper position and locked thereat, it is inclined from front to rear, and portion rotates away and locks thereat to become a seat for ride-on operation.

20 Claims, 17 Drawing Sheets

(56) References Cited

U.S. PATENT DOCUMENTS

| | | |
|---|---|---|
| 6,581,949 B2 | 1/2003 | Lopez |
| 6,588,787 B2 | 7/2003 | Ou |
| 7,077,229 B2 | 7/2006 | Lee |
| 8,413,753 B2 | 4/2013 | Wu et al. |
| D729,592 S | 4/2015 | Zhang |
| 9,010,780 B1 | 4/2015 | Chiu |
| 9,016,702 B2 | 4/2015 | Huang |
| 9,227,687 B2 | 1/2016 | Delgatty et al. |
| 9,233,728 B2 | 1/2016 | Mucaro |
| 9,409,617 B2 | 8/2016 | Chen |
| 9,254,883 B2 | 9/2016 | Berndorfer et al. |
| D774,979 S | 12/2016 | Delgatty et al. |
| 9,545,969 B2 | 1/2017 | Byrne et al. |
| 2004/0026147 A1 | 2/2004 | Kao et al. |
| 2016/0200389 A1* | 7/2016 | Chen ............... B62K 3/002 280/639 |
| 2017/0190377 A1* | 7/2017 | Ku ............... B62K 15/006 |

OTHER PUBLICATIONS

Micro-Kickboard Mini Seat and scooter, retrieved from htttps://www.microkickboard.com/mini-seat-o-bar on Jan. 7, 2019.
Radio Flyer Scoot 2 Scooter, retrieved from https://www.radioflyer.com/scoot-2-scooter-bundle.html on Jan. 7, 2019.
Hover-1 XLS Folding Electric Scooter, retrieved from http://www.hover-1.com/hover1-xls-specs/ on Jan. 7, 2019.

\* cited by examiner

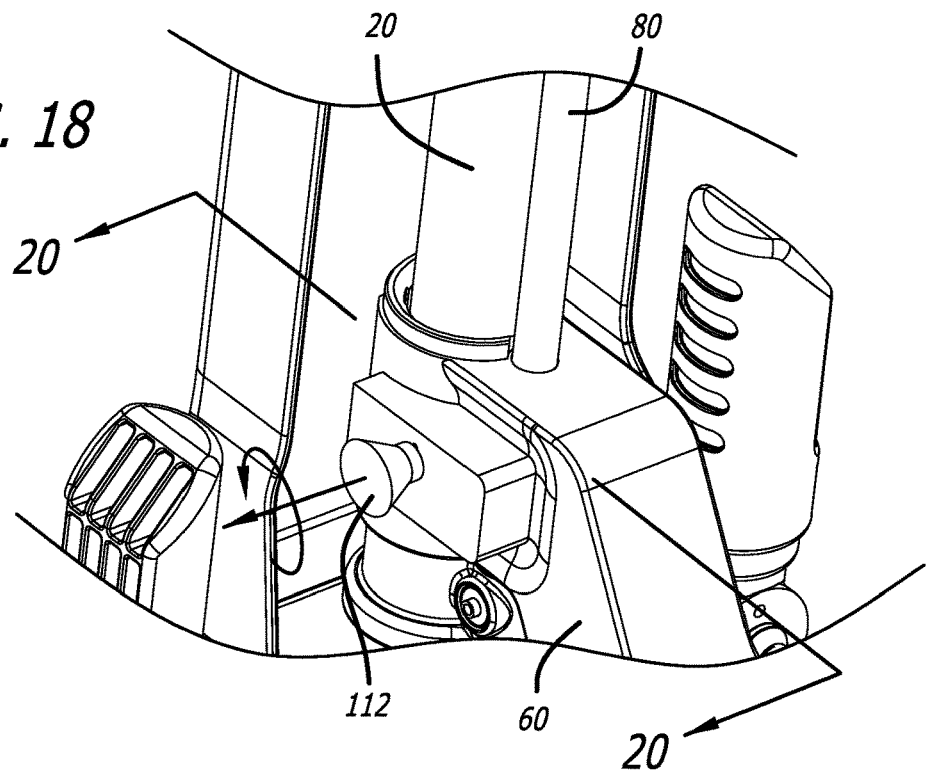
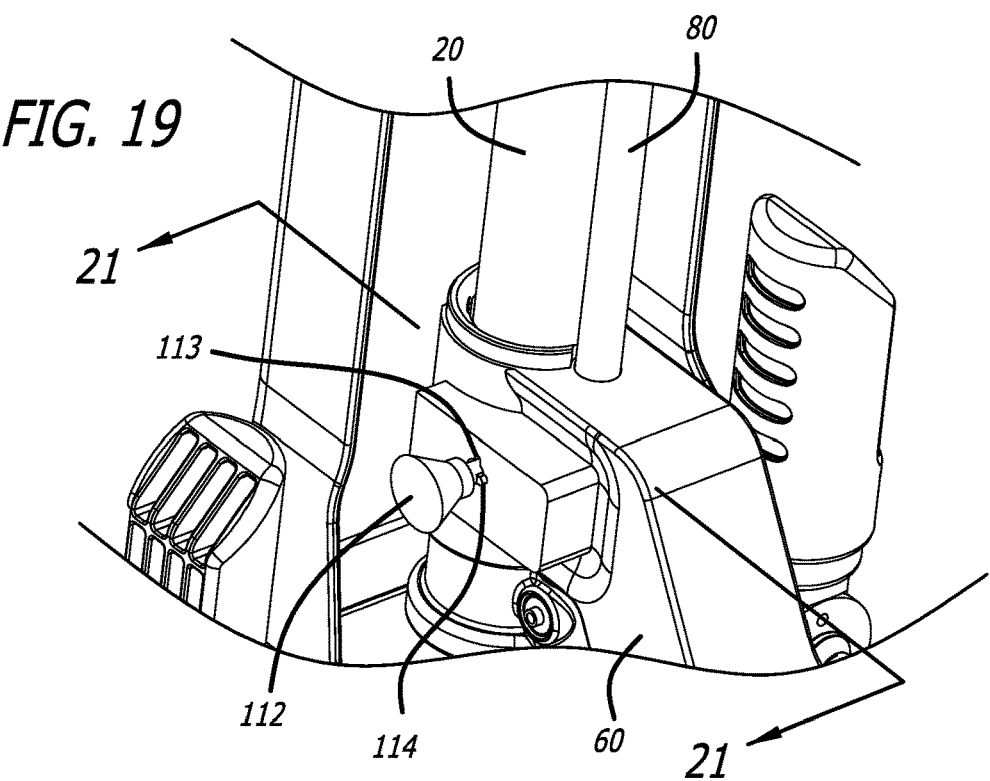

TRANSFORMING ELECTRIC SCOOTER HAVING A STAND-ON CONFIGURATION AND A RIDE-ON CONFIGURATION

CROSS-REFERENCE TO RELATED APPLICATIONS

None.

BACKGROUND OF THE INVENTION

1. Field of the Invention

This invention relates to the field of personal transportation vehicles. More particularly, this invention relates to the field of a transforming scooter than has both a stand-on configuration for stand-on riding, and a ride-on configuration for seated riding.

2. Description of Related Art

There are a number of existing designs for personal transportation vehicles, including electrically powered vehicles, that transform between a stand-on configuration and a ride-on configuration. Stand-on vehicles and ride-on vehicles are both sometimes referred to as scooters. The term "scooter" will be used broadly herein to refer to a stand-on personal vehicle, a ride-on personal vehicle, or a vehicle that has both stand-on and ride-on configurations.

The following references disclose scooters that transform between ride-on configurations and stand-on configurations.

U.S. Pat. No. 2,439,556 issued to Bancroft and U.S. Pat. No. 9,016,702 issued to Huang disclose scooters in which a seat and an attached seat support fold out of the footboard for use in a ride-on configuration.

U.S. Pat. No. 9,010,780 issued to Chiu discloses a scooter in which a seat support folds out of the footboard, and then a seat is attached to the seat support, for use in a ride-on configuration.

U.S. Pat. No. 9,409,617 issued to Chen and U.S. Pat. No. 9,254,883 issued to Berndorfer disclose scooters in which a supporting arm for the footboard pivots to become a seat or a seat support.

Additional transforming scooter designs are various disclosed in U.S. Pat. No. 7,077,229 issued to Lee; U.S. Pat. No. 9,223,728 issued to Mucaro, U.S. Pat. No. 9,545,969 issued to Byrne; and U.S. Pat. No. 6,089,586 issued to Rudell. Still further, certain commercial scooters designs feature a seat support that removably mounts to the floorboard such as by sliding into and out of a receiving cavity within the floorboard.

SUMMARY OF THE INVENTION

The present invention is of a transforming scooter that transforms or reconfigures between a stand-on scooter and a ride-on, i.e., sit-on scooter. The scooter can be a motorized scooter powered by a battery.

In an illustrative embodiment, the scooter includes front and generally fixed frame member which is generally but not necessarily completely vertical, and which includes a head tube that contains a steering tube through which a handlebar or other steering handle is rotationally coupled to a front wheel. A second and movable frame member has a rear wheel attached proximate its rear end. The front of the movable frame member can be selectively coupled to the front frame member at either an upper position or a lower position thereof, and locked thereat. In the embodiment, the movable frame member slides along the front frame member between the upper and lower positions at which it can be selectively locked.

In the ride-on configuration, the second and movable frame member is attached to and locked to the front frame member at the lower position. In this configuration the second frame member extends generally horizontal to the ground and close to it. In this configuration the user stands on the second frame member, using the second frame member as a floorboard or standing platform.

To use the scooter as a ride-on vehicle, the user uncouples the second and movable frame member from the lower position on the fixed frame member, slides the movable frame member up the fixed frame member, and locks the movable frame member at the upper position on the fixed frame member. The second frame member now extends at roughly a 45° angle relative to horizontal, with the rear wheel still contacting the ground. The user now folds what had been a floorboard from the second frame member, such that the floorboard now functions as a seat. The seat locks relative to the second frame member at a position in which the seat extends generally horizontally. In this position what had been the floorboard now becomes a seat. The user can sit on the seat and use the scooter as a ride-on scooter. In the illustrative embodiment a pair of foot pegs fold away from the front frame member for the rider to rest his feet upon in this configuration.

As used herein, the term "steering column" broadly means the part to which the front wheel and handlebar are rotationally coupled so that the handlebar can be used to steer the scooter. The term "head tube" broadly defines the part of the scooter in which the steering column rotates, and broadly includes associated structure.

In one aspect therefor, the invention is of an electric scooter that transforms between a stand-on and a ride-on configuration. The scooter includes a head tube and a front wheel pivotally attached to the head tube. A frame member, which is the "second frame member" in the foregoing description, has a front portion and a rear portion. The front portion is connected to the head tube and is repositionable on the head tube, such as being in lockable sliding engagement to the head tube, such that the front portion of the head tube can be locked at either a lower position or an upper position on the head tube, i.e., at two different heights on the head tube. In the lower position the frame member is generally horizontal and is suitable for a user to stand upon while riding the scooter as a stand-on scooter. This defines the stand-on configuration of the scooter.

In contrast, in the upper position the frame member is inclined at an angle of approximately 45 degrees away from its front portion where it is attached to the head tube, to its lower and rear portion at which the rear wheel is attached. The floorboard is pivotally attached to the frame member such that, when pivoted away from the frame member to a generally horizontal position and locked thereat, what had been the floorboard is now a seat that is suitable for the user to sit upon and thus to use the scooter as a ride-on scooter.

The scooter preferably has a battery and motor so that it is electrically powered. The electric motor can be a brushed or brushless motor, driving the rear wheel by chain and sprocket or belt drive, or it can be a hub motor located within the rear wheel. The right grip on the scooter's handlebar can have a thumb throttle or other throttle, or it can function as a twist throttle as on a conventional motorcycle. The steering column can be telescoped such that the handlebar can be raised or lowered to different heights to accommodate different sized riders and so that the user can raise or lower the handlebar as desired depending on in which configuration he is using the scooter, and for storage.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIG. 18 is an oblique left side view of a secondary configuration lock according to a second embodiment, with the secondary lock in its locked position.

FIG. 19 is an oblique left side view of the secondary configuration lock shown in FIG. 18, but with the secondary lock in its unlocked position.

DETAILED DESCRIPTION OF THE PREFERRED EMBODIMENTS

Figure 1:
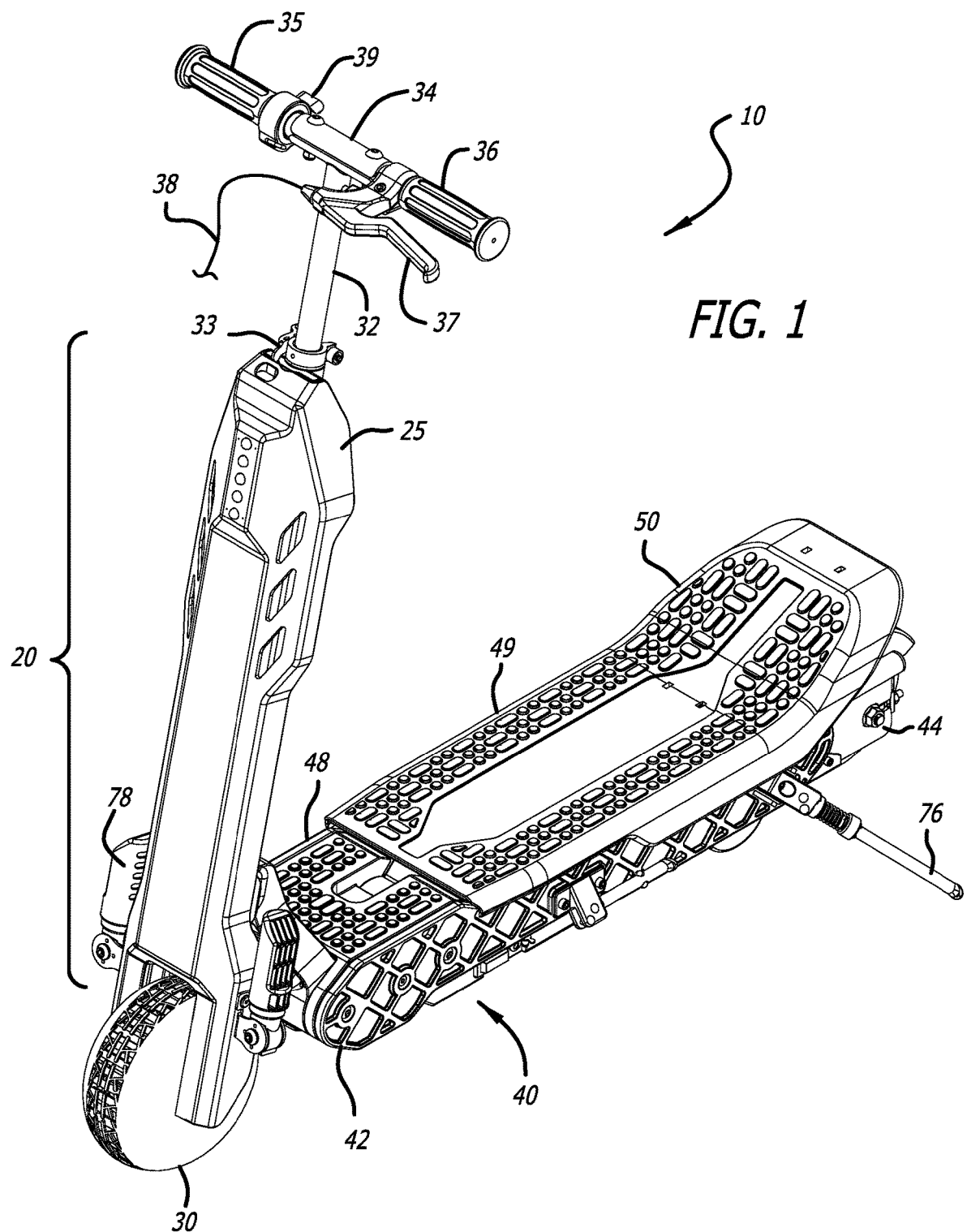
FIG. 1 is an oblique view from the front and left side of the transforming scooter of the present invention according to a first illustrative embodiment, with the scooter being in its stand-on configuration.
Figure 2:
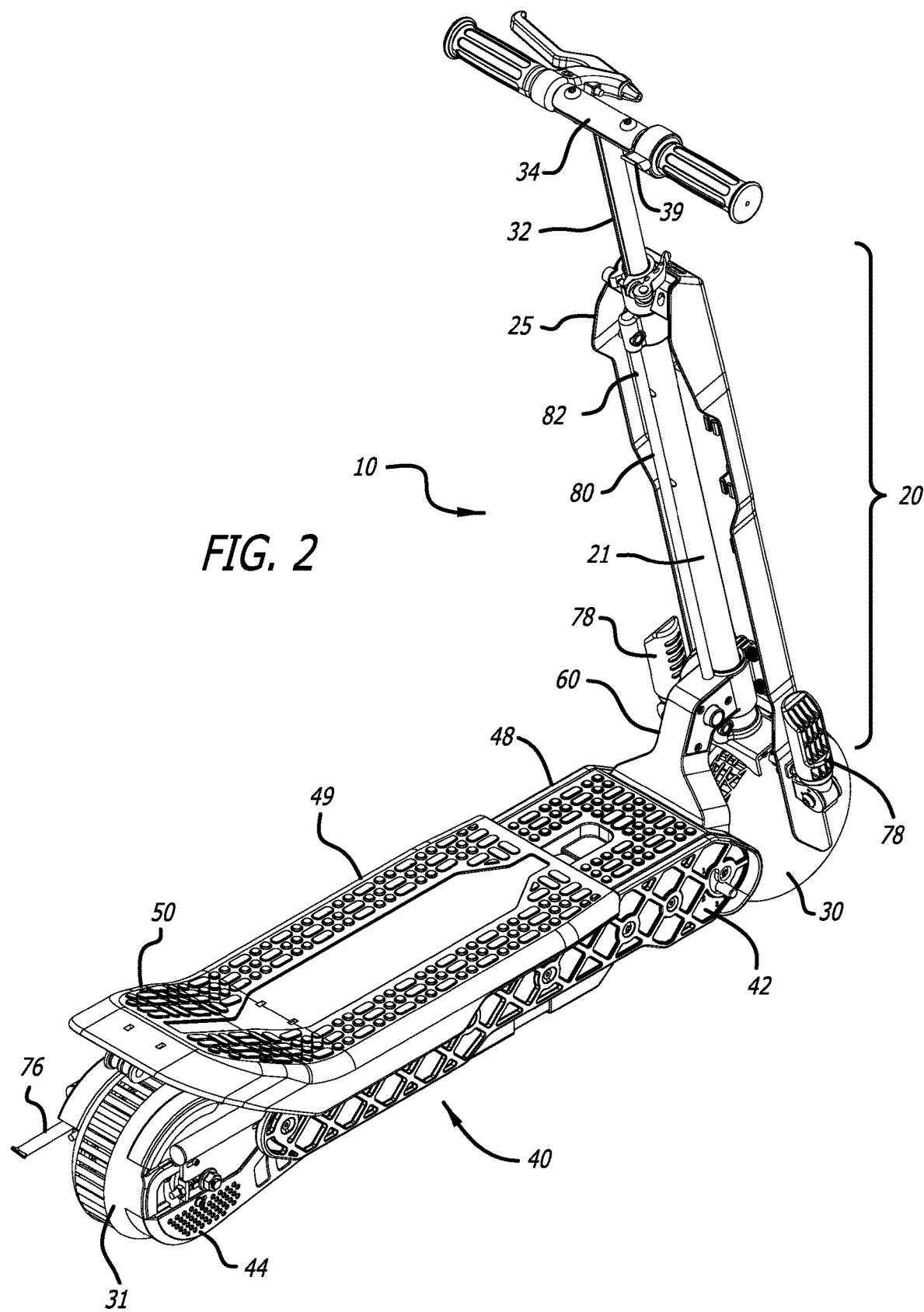
FIG. 2 is an oblique view from the rear and right side of the transforming scooter of FIG. 1.

FIG. 1 is an oblique view from the front and left side of the transforming scooter 10 of the present invention according to a first illustrative embodiment, with the scooter 10 being in its stand-on configuration. FIG. 2 is an oblique view from the rear and right side of the transforming scooter of FIG. 1.

The scooter includes two frame members: a first and fixed frame member 20, which in this embodiment comprises a combination of head tube 21 and support rod or tube 80 (hereafter, simply "support rod"); and a second and movable frame member 40. In the embodiment steering column 32 extends into head tube 21, and rotatably connects handlebar 34 to front wheel 30 such that a rider can steer front wheel 30 and thus scooter 10 via handlebar 34. Steering column 32 preferably telescopes into and out of head tube 21 to allow the rider to adjust the height of handlebar 34 according to his own preference and according to whether he is using scooter 10 in its stand-on configuration or its ride-on configuration. Quick release handle 33 allows the user to quickly and easily adjust the handlebar height. Preferably steering column 32 and head tube 21 are additionally locked together by a conventional push button spring clip (not shown) that prevents steering column 32 and hence the handlebars 34 from accidentally collapsing downward. The push button spring clip can provide for at least three positions: an extended-most position for the stand-on configuration shown in FIG. 1; a lower position for the ride-on configuration shown in FIG. 6; and a collapsed position for storage shown in FIG. 22. In this embodiment fairing 25 is a lightweight plastic fairing that serves primarily aesthetic purposes.

Handlebar 34 has a right hand grip 35 and a left hand grip 36, as well as a brake handle 37 which is coupled to a brake mechanism (not shown) via brake cable 38. Right hand grip 35 includes a throttle 39. Alternatively, right hand grip 35 could twist and function as a throttle similar to the operation of a throttle on a motorcycle.

Throttle 39 controls the speed of the scooter which is powered by a battery and an electric motor (not shown).

Scooter 10 also preferably has a kickstand 76, and folding foot pedals 78 which are used in the ride-on configuration. The scooter could have separate kickstands for use in the ride-on and stand-on configurations, respectively.

Second and movable frame member 40 supports a floorboard that includes a front floorboard 48 and a rear floorboard 49. Front and rear floorboard 48, 49 define a platform for the user to stand upon. Front and rear floorboards 48, 49 are generally horizontal, which can mean that they extend at an angle of less than 10° relative to horizontal and preferably less than 5° relative to horizontal.

Preferably fixed frame member 20 including head tube 21 is raked back at about a 15° angle relative to vertical, in which case front and rear floorboards 48, 49 extend and at an angle of approximately 75° relative to head tube 21. More generally, in this configuration the floorboards are at an angle of 60°-90° relative to head tube 21, and more preferably within the range 70°-80° relative to head tube 21. Preferably the two floorboards 48, 49 are disposed at the same height in the stand-on configuration as shown. Preferably the rear of floorboard 49 has an upwardly angled portion 50 which, in the stand-on configuration, helps to prevent the rider from attempting to place one of his feet too far rearward. Movable frame member 40 has a front end 42 and a rear end 44.

Front wheel 30 is mounted proximate a lower end of the fixed frame member. Rear wheel 31 is at, or is proximate to, rear portion 44 of frame member 40.

Movable frame member 40 is selectably positionable on the fixed frame member 20. In the illustrative embodiment, fixed frame member 20 includes head tube 21 and support rod 80 which extends in parallel to head tube 21. Support rod 80 has an upper receiving hole 82 therein at an upper position, and a lower receiving hole 84 (FIG. 8) therein at a lower position. A locking mechanism that is integrated into connector 60 can be selectively engaged with either of those holes 82/84 or other features that perform a similar function.

A connector 60 is mounted at the front end 42 of movable frame member 40, to selectively and releasably connect the movable frame member 40 to fixed frame member 20. In this embodiment connector 60 slides up and down fixed frame member 20 via collar 26 which extends around head tube 21, and locks at either the upper or lower position.

Figure 3:
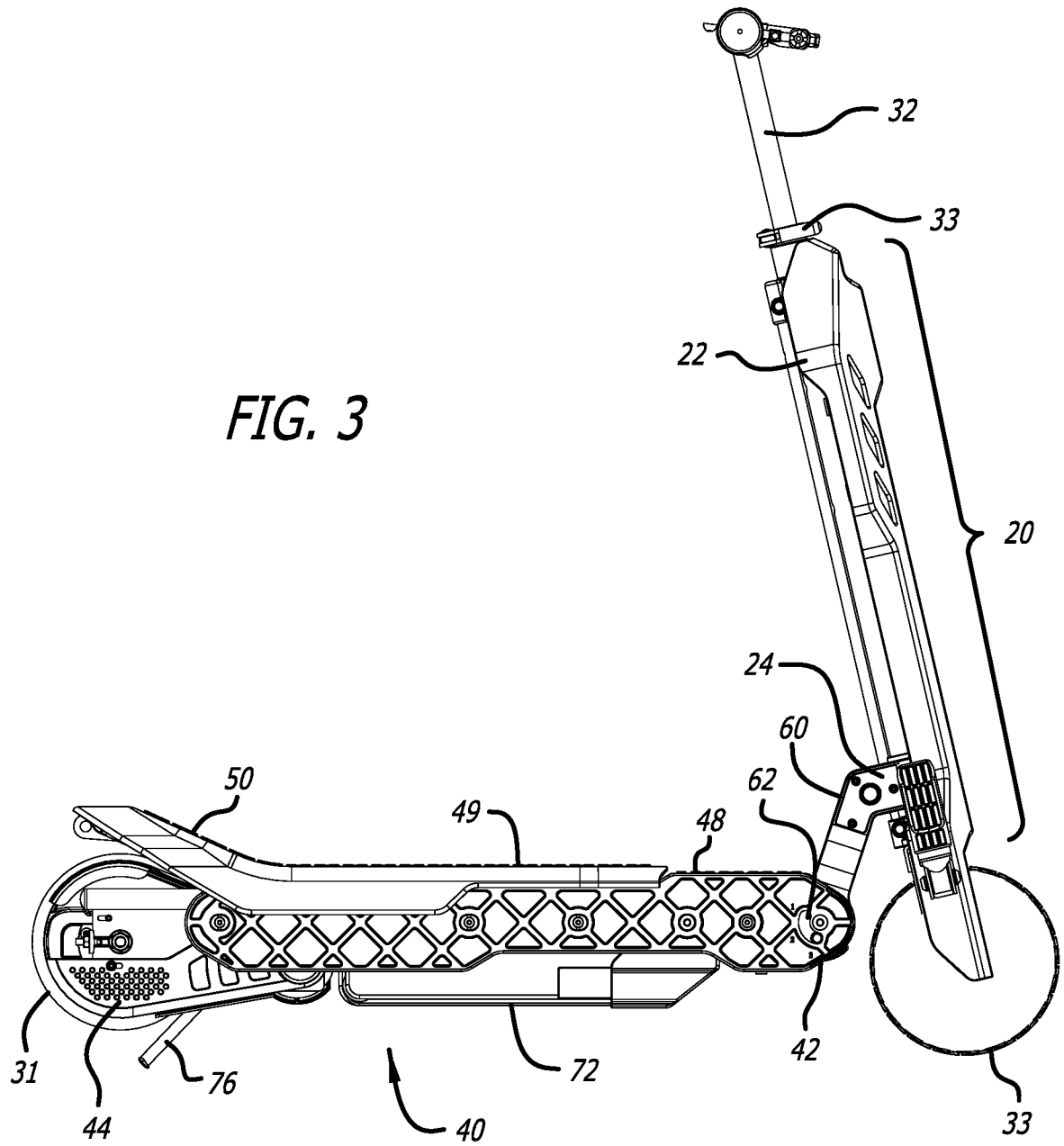
FIG. 3 is a left side elevation view of the transforming scooter of FIG. 1.

FIG. 3 is a left side elevation view of the transforming scooter of FIG. 1. Battery housing 72 covers an electric battery (not shown). Pivot member 62 allows the angle between movable frame member 40 and connector 60, and hence the angle between movable frame member 40 and fixed frame member 20, to change as the scooter is transformed between its stand-on configuration and its ride-on configuration.

Figure 4:
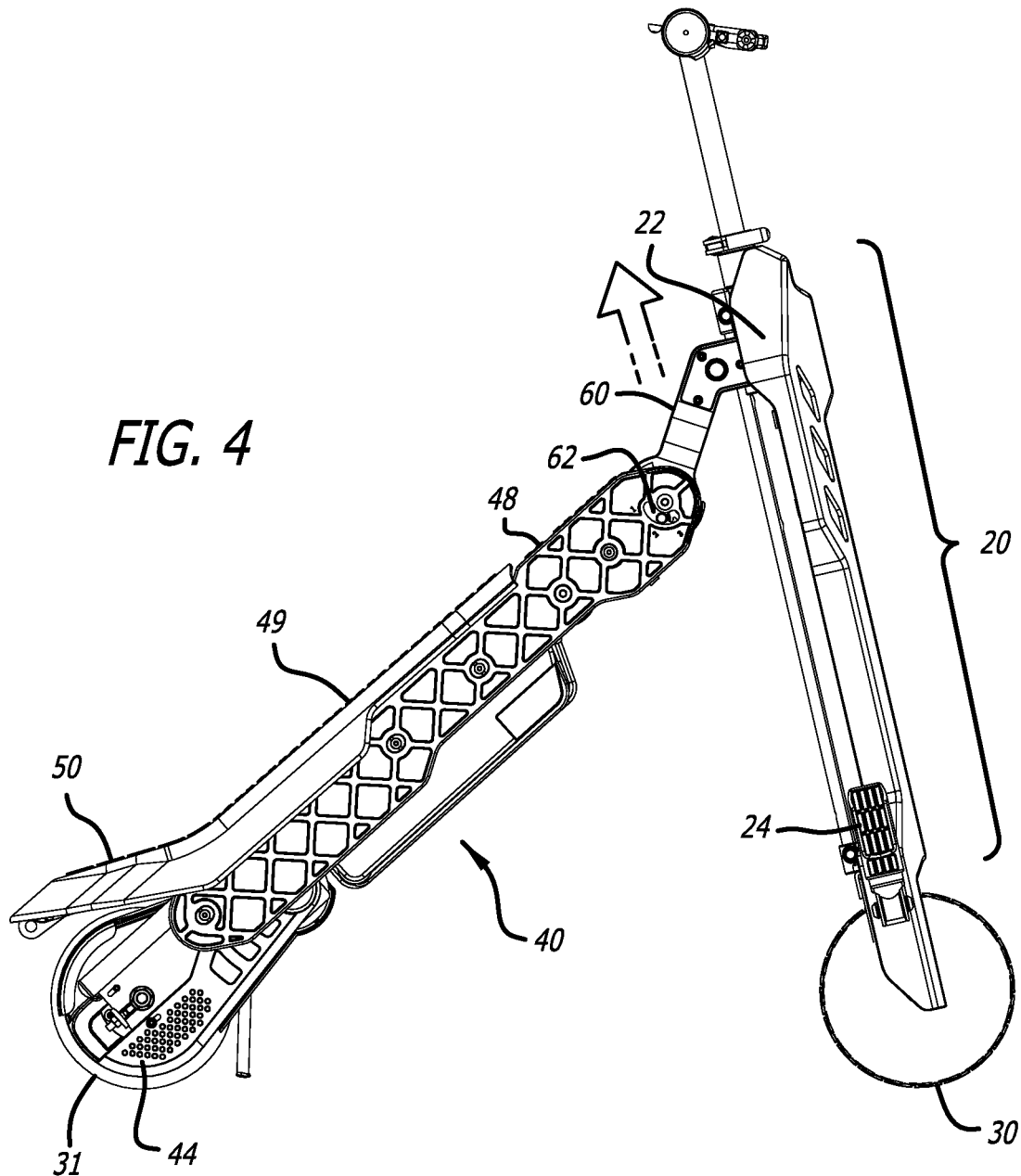
FIG. 4 shows the transforming scooter of FIG. 3 and from the same angle, but with the scooter in the process of being transformed into its ride-on configuration, the movable frame member now being located at its upper position on the front frame member.

FIG. 4 shows the transforming scooter of FIG. 3 and from the same angle, but with the scooter in the process of being transformed into its ride-on configuration, the movable frame member 40 now being located at its upper position on the front frame member. In this position connector 60 has been disengaged from lower receiving hole 84 (FIG. 8) on support rod 80, and slid upwards on head tube 21 and support rod 80 to engage upper receiving hole 82 on support rod 80 via at least a first and primary locking mechanism 11 which will be shown and described in detail below. Movable frame member 40 is now at an angle of approximately 45° with respect to the horizontal.

Figure 5:
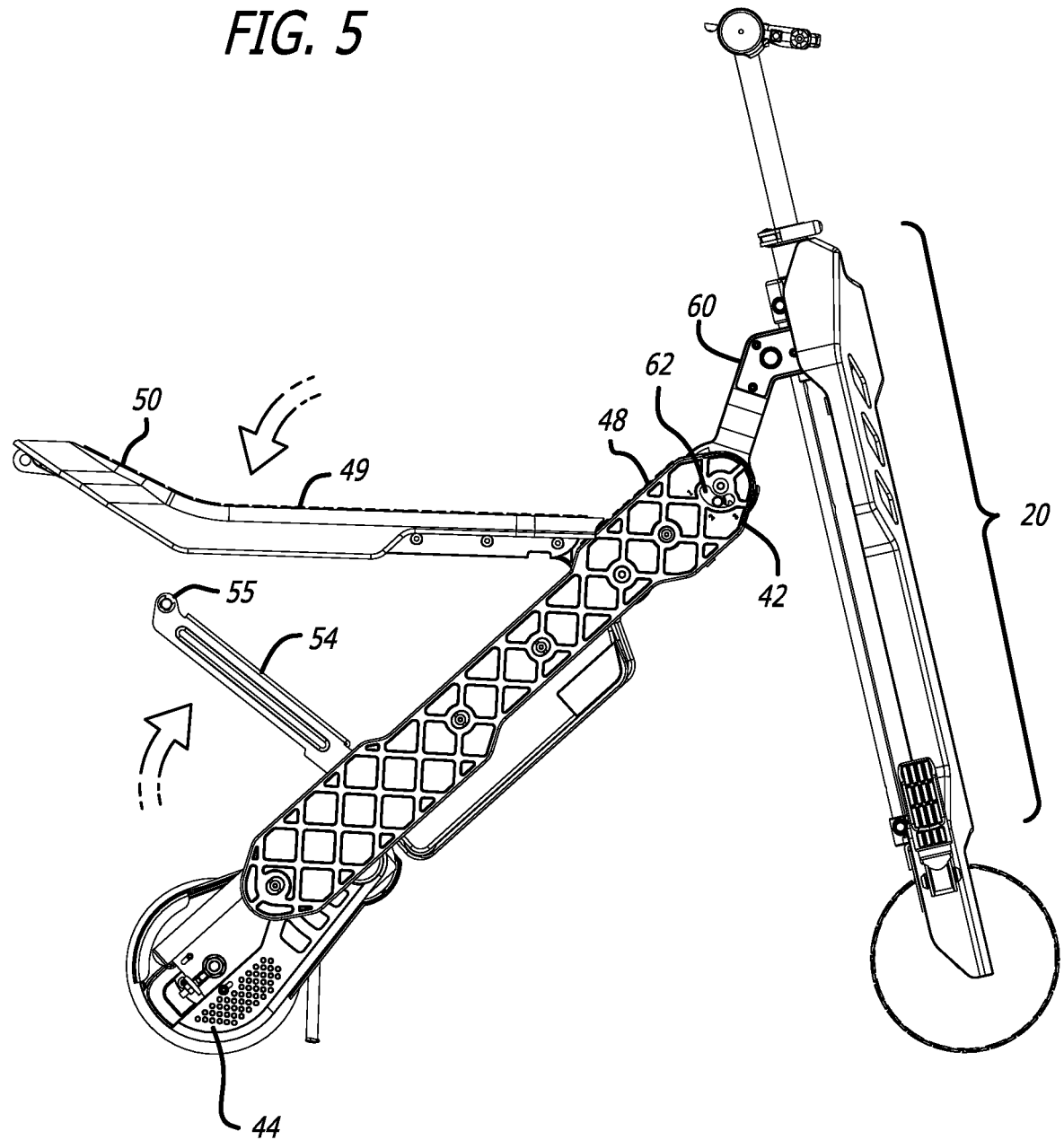
FIG. 5 shows the transforming scooter of FIG. 4 and from the same angle, but with the scooter further in the process of being transformed into its ride-on configuration, the seat now having been folded away from the second frame member.

FIG. 5 shows the transforming scooter of FIG. 4 and from the same angle, but with the scooter further in the process of being transformed into its ride-on configuration, the seat 49 now having been folded away from the second and fixed frame member 40. Seat support bracket 54 has been folded away from movable frame member 40. A crossbar 55 that is fixed on the seat support bracket 54 will engage seat 49 to support it. Seat support bracket 54 could be pivotally attached and folded away from either movable frame member 40 as shown, or alternatively from seat 49. A spring or other resilient mechanism, and even a shock absorber, could be integrated with or attached to seat support bracket 54 in order to provide a more cushioned and more comfortable ride for the rider.

Figure 6:
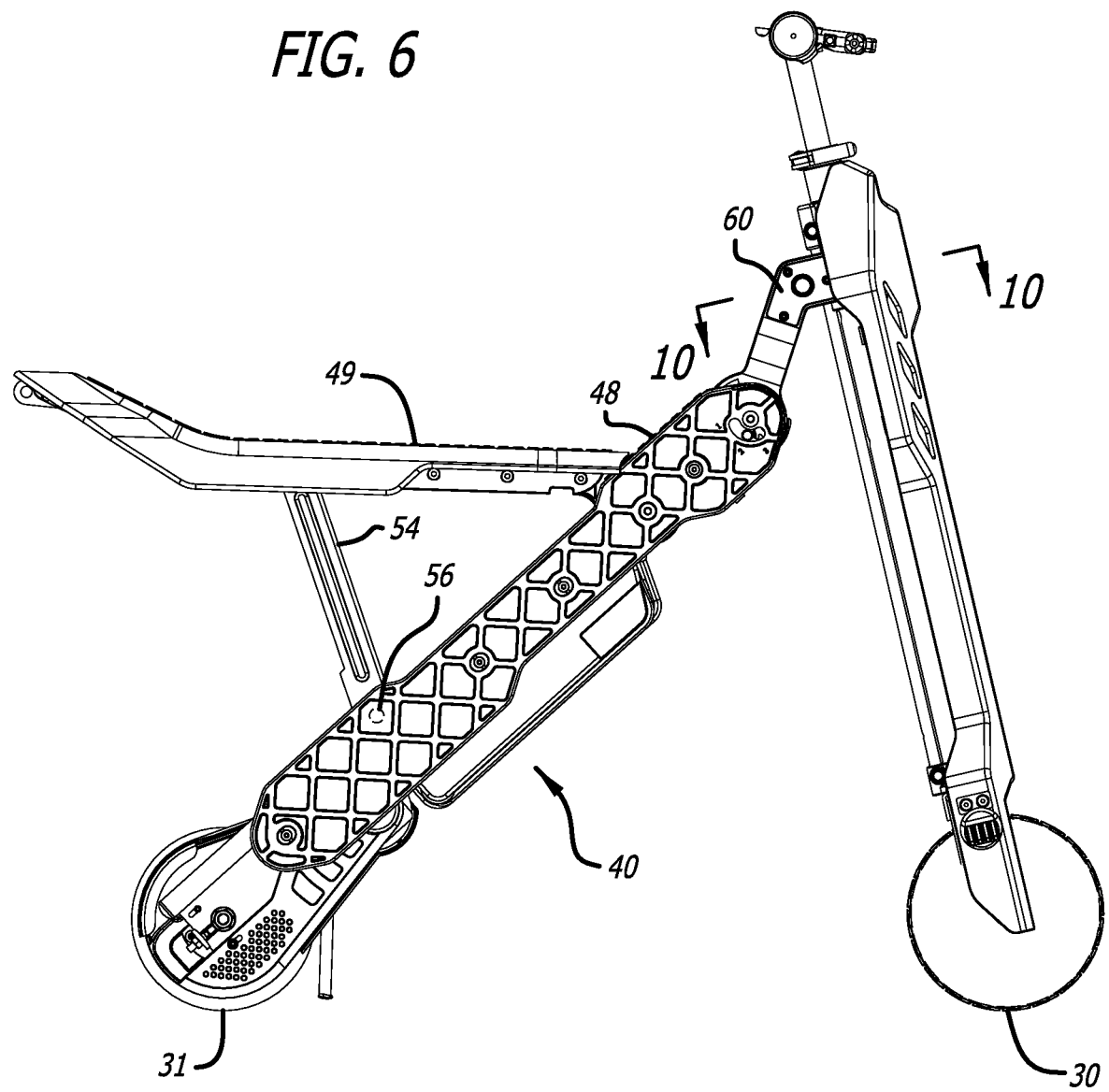
FIG. 6 shows the transforming scooter of FIG. 5 and from the same angle, but with the scooter now fully transformed into its ride-on configuration.

FIG. 6 shows the transforming scooter of FIG. 5 and from the same angle, but with the scooter now fully transformed into its ride-on configuration. Seat support bracket 54 now supports floorboard/seat 49 and is locked thereto. The seat 49 extends generally horizontally in order to comfortably support the rider, which can mean that seat 49 is tilted at an angle of less than 10° relative to horizontal. The seat 49 could be tilted back slightly in order to cradle the rider's in the area where seat 49 meets upwardly angled portion 50. Pedals 78 have been folded down for the rider to rest his feet upon in this ride-on configuration. In this configuration and this embodiment the second frame member now extends at roughly a 45° angle relative to horizontal. The second frame member 40 is therefore at an angle of approximately 60° relative to fixed frame member 20, when measured at the acute angle rather than the corresponding obtuse angle of approximately 120°. In this ride-on configuration a user will have normally loosened quick-release 33 and pressed handlebars 34 downward so that steering column 32 telescopes into head tube 21 to some extent, then tightened quick-release 33 again. This makes for a more natural riding position. This position is shown in the figure. Preferably in this position the conventional push button spring clip (not shown) previously discussed locks the steering column at the correct height.

Figure 7:
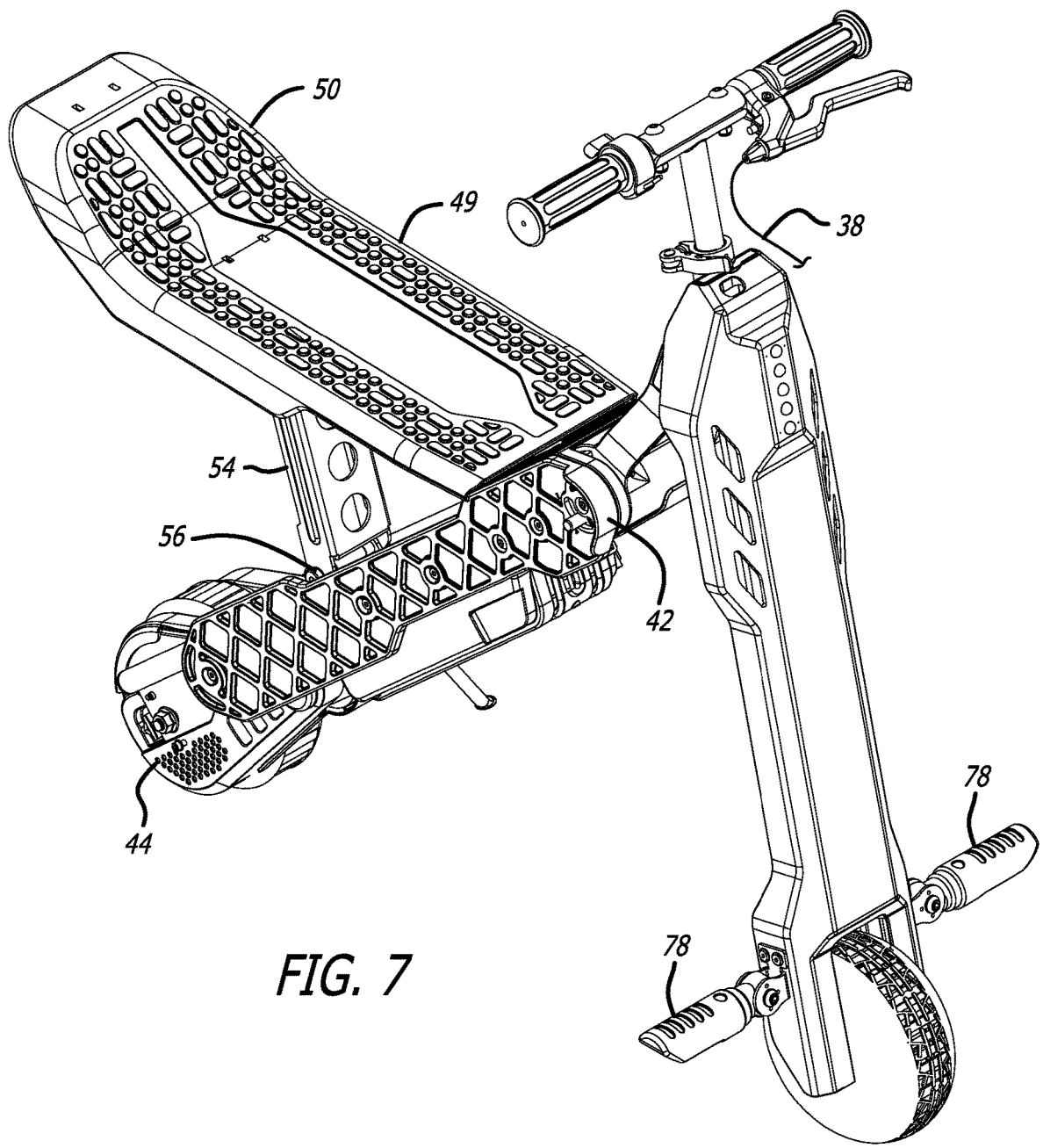
FIG. 7 is an oblique view from the front and right side of the transforming scooter of FIG. 6.

FIG. 7 is an oblique view from the front and right side of the transforming scooter of FIG. 6.

Figure 8:
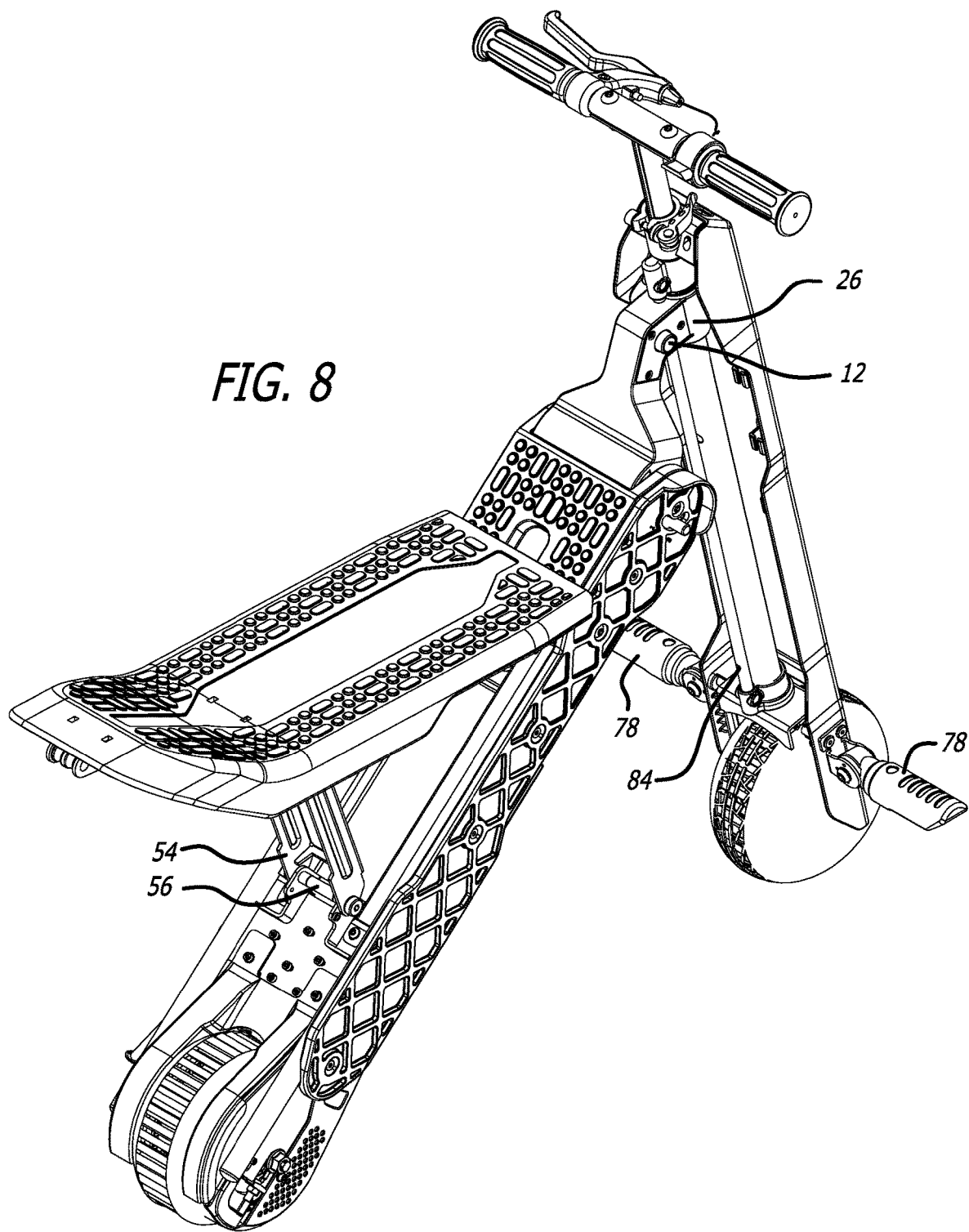
FIG. 8 is an oblique view from the rear and left sides of the transforming scooter of FIG. 6.

FIG. 8 is an oblique view from the rear and left side of the transforming scooter of FIG. 6. Visible in this view is hinge 56 to which seat support bracket 54 is rotatably mounted.

Figure 9:
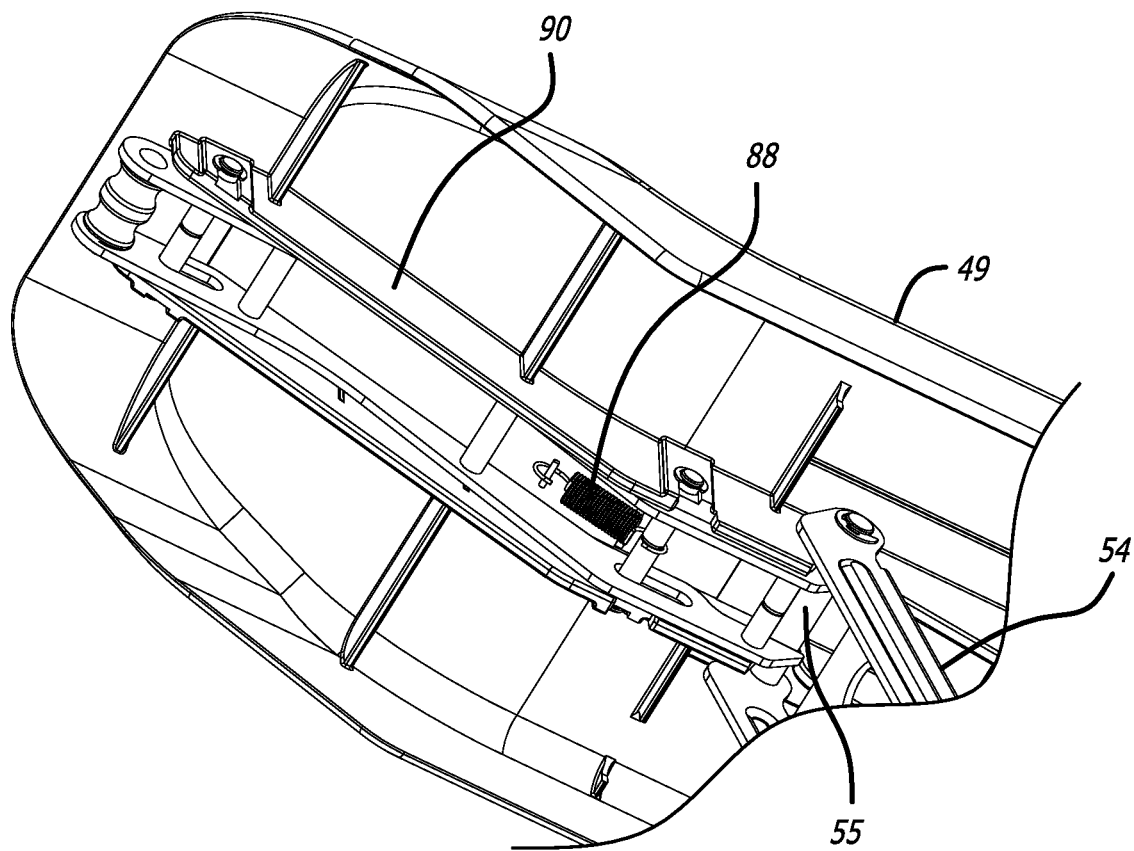
FIG. 9 is an oblique view of the transforming scooter in FIG. 8 from the underside and right side of the area in which pivoting floorboard/seat 48 locks to seat support bracket 54.

FIG. 9 is an oblique view of the transforming scooter in FIG. 8 from the underside and right side of the area in which pivoting floorboard/seat 49 locks to seat support bracket 54. The mechanism by which the seat 49 securely engages seat support bracket 54 is presented in FIGS. 16 and 17.

Figure 10:
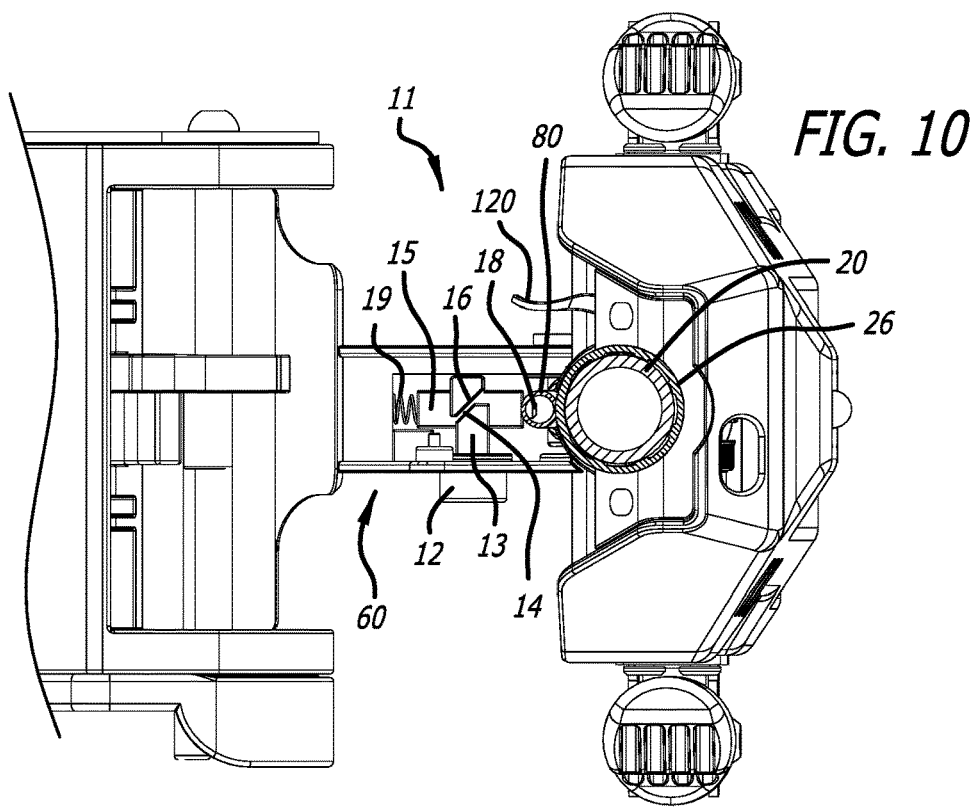
FIG. 10 is a top cutaway view of the transforming scooter of FIG. 6 taken along section line 10-10 showing details of the lock 11 which locks connector 60 to support rod 80, with the lock 11 in its locked configuration.
Figure 12:
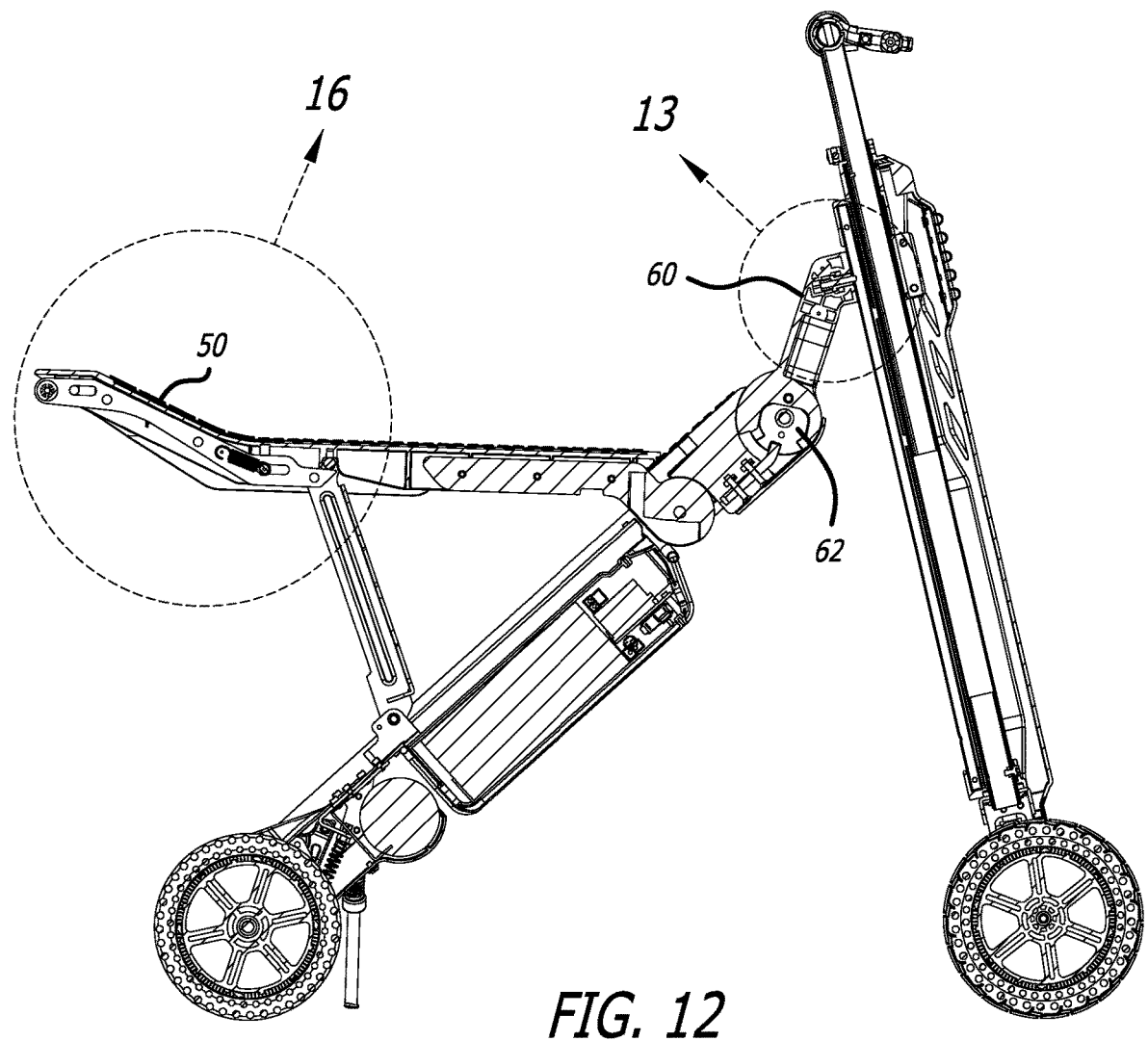
FIG. 12 is a partial cutaway right side elevation view of the transforming scooter of FIG. 6.

FIG. 10 is a top cutaway view of the transforming scooter of FIG. 6 taken along section line 10-10 showing details of the primary lock 11 which locks connector 60 to support rod 80 hence to fixed frame member 20, with the lock 11 in its locked configuration, and FIG. 12 shows the primary lock 11 in its unlocked position.

In this embodiment primary lock 11 includes: a push button 12 which is perhaps most clearly seen in FIG. 8; first rod 13 having a sloped surface or ramp 14; second rod 15 connected to a sloped surface or ramp 16; a pin 18 at the front of rod 15; a spring 19 which biases rod 15 forward (toward the front of the scooter); and lower receiving hole 84 (FIG. 8) in support rod 80. In its unpressed (locked) state, pin 18 is biased by spring 19 into lower receiving hole 84 or alternatively upper receiving hole 82 on support rod 80, thus locking connector 60 to support rod 80.

Primary lock 11 is unlocked by the user pressing release button 12. Pressing button 12 causes first rod 13 to move inward, which via ramps 14 and 16 cause rod 15 to move backwards (toward the rear of the scooter), thus pulling pin 18 out of receiving hole 82/84 on support rod 80. Connector 60 is now to free to move up or down on head tube 21 and support rod 80, in the absence of any secondary locking mechanism. In the preferred embodiment, a secondary locking mechanism which will be described below is provided for safety. The secondary locking mechanism ensures that a rider cannot accidentally unlock the mechanism, such as by accidentally pressing release button 12 with his knee while riding the scooter.

FIG. 12 is a partial cutaway right side elevation view of the transforming scooter of FIG. 6.

Figure 13:
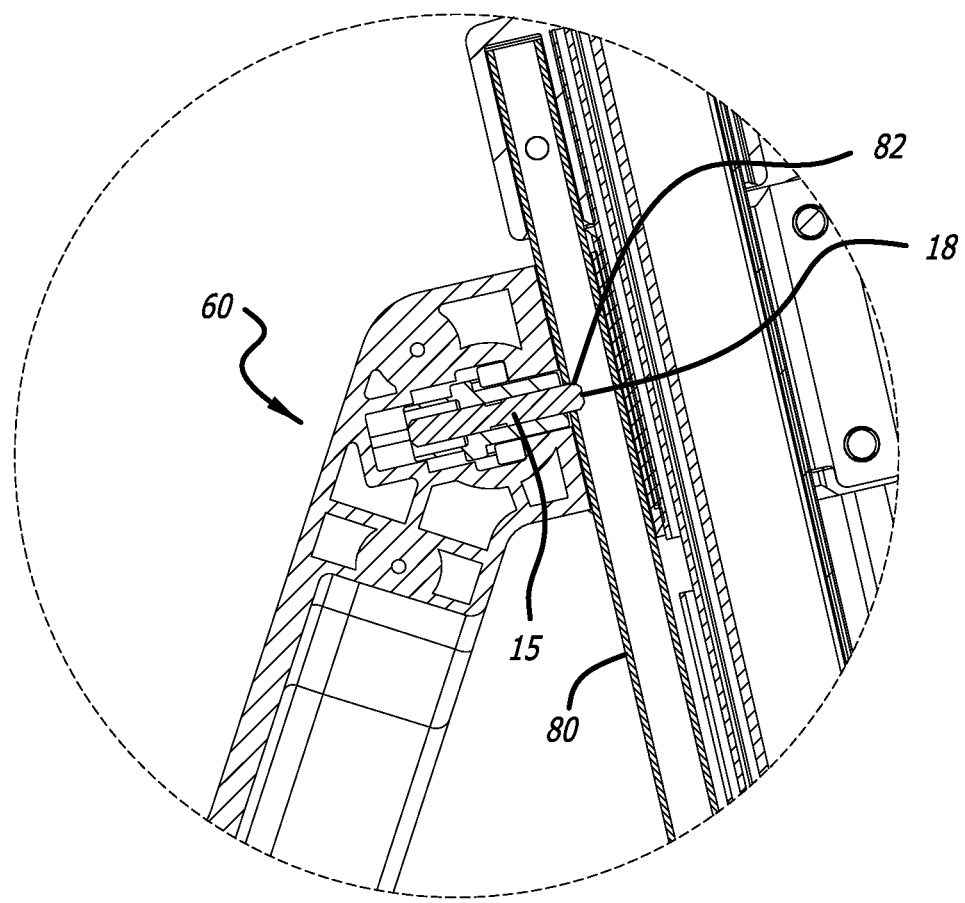
FIG. 13 is a cutaway right side view of area designated as 13 in FIG. 12.

FIG. 13 is a cutaway right side view of area designated as 13 in FIG. 12. In this view rod 15 including pin 18 is biased forward by spring 19 (FIG. 10) causing pin 18 to extend into upper receiving hole 82 in support rod 80, thus locking connector 60 at its upper position, i.e., the scooter is in its ride-on configuration.

Figure 14:
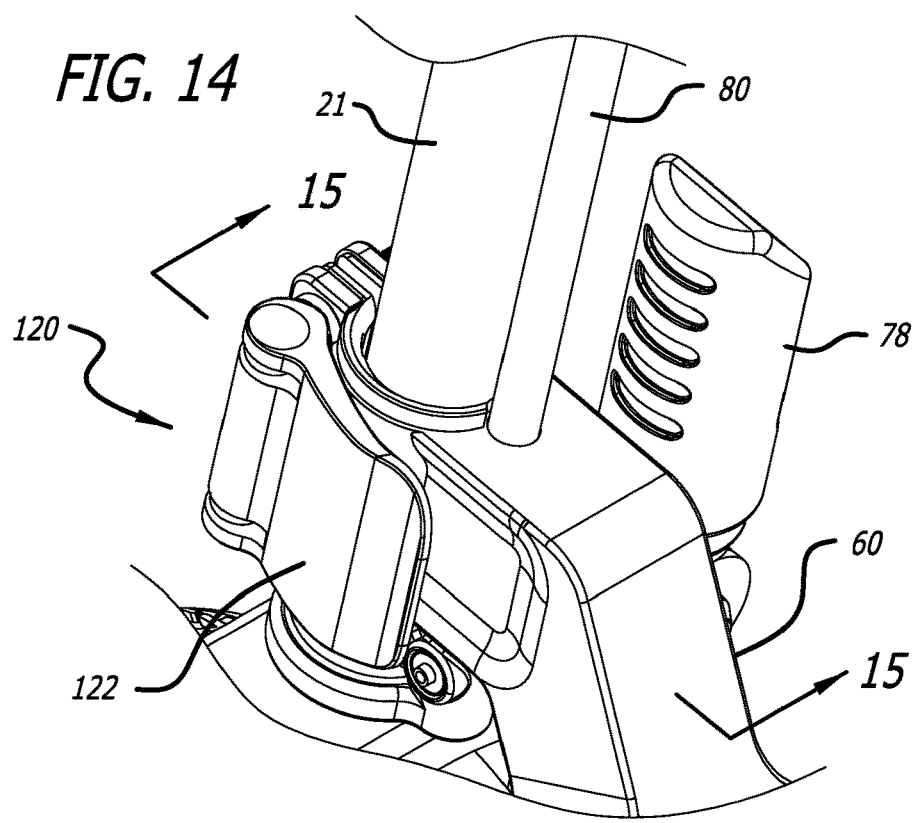
FIG. 14 is an oblique left side view of a secondary configuration lock of the transforming scooter of FIG. 1, according to a first embodiment of the secondary configuration lock.

FIG. 14 is an oblique left side view of a secondary configuration lock of the transforming scooter of FIG. 1, according to a first embodiment of the secondary configuration lock. The "secondary configuration lock" is a secondary lock that helps lock the scooter into the desired configuration, i.e., into either the stand-on configuration or the ride-on configuration. In this embodiment the secondary configuration lock includes a quick release mechanism 120 including quick release handle or lever 122. The quick release mechanism clamps connector 60 onto head tube 21, thus locking connector 60 and movable frame member 40 to the front and fixed frame member 20.

Figure 15:
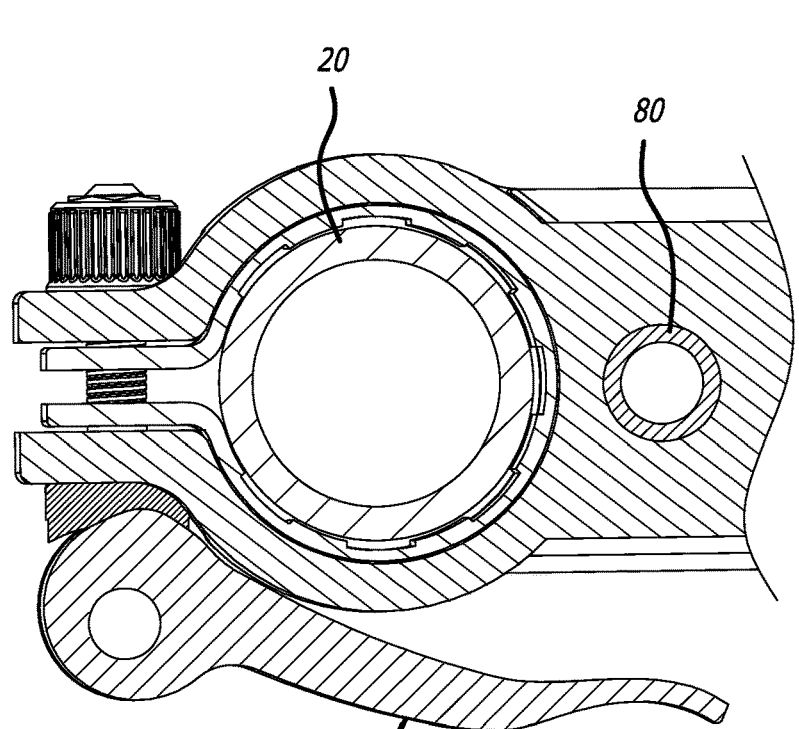
FIG. 15 is a cutaway view of the mechanism of FIG. 14 taken along section line 15-15.

FIG. 15 is a cutaway view of the mechanism of FIG. 14 taken along section line 15-15.

Figure 16:
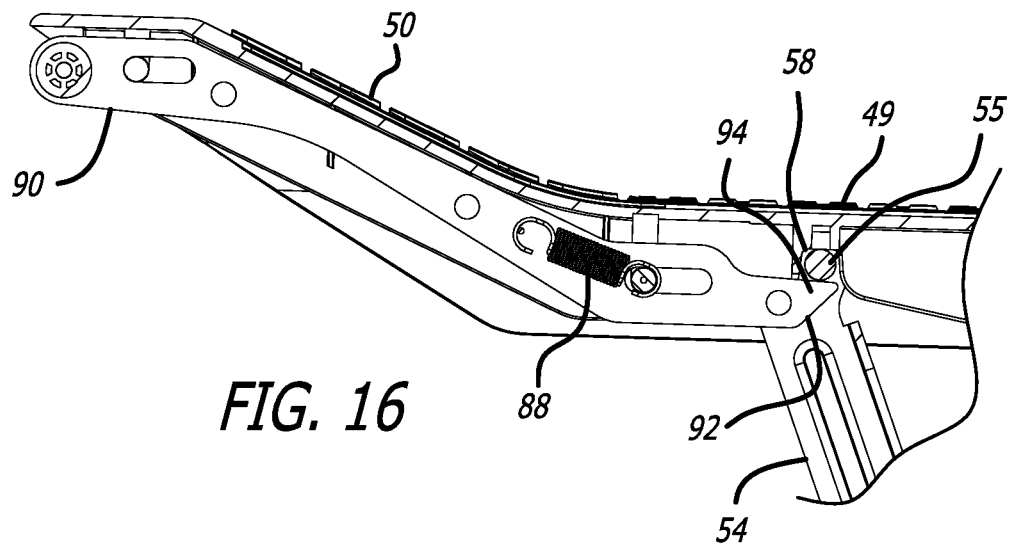
FIG. 16 is a cutaway right side view of area designated as 16 in FIG. 12, with slide lock bracket 90 in its locked position holding seat support bracket 54 thereto.

FIG. 16 is a cutaway right side view of area designated as 16 in FIG. 12. A slide lock bracket 90 is shown in its locked position holding seat support bracket 54 thereto. In this figure slide lock bracket 90 is biased by spring 88 toward its forward position as shown. Slide lock bracket 90 includes ramp 92 and retention surface 94. In this position retention surface 94 holds crossbar 55 of seat support bracket 54 securely within receiving notch 58, thus locking seat support bracket 54 to seat 49. Ramp 92 allows seat 49 to be folded down onto seat support bracket 54 and latched thereto without any other intervention or manipulation by the user.

Figure 17:
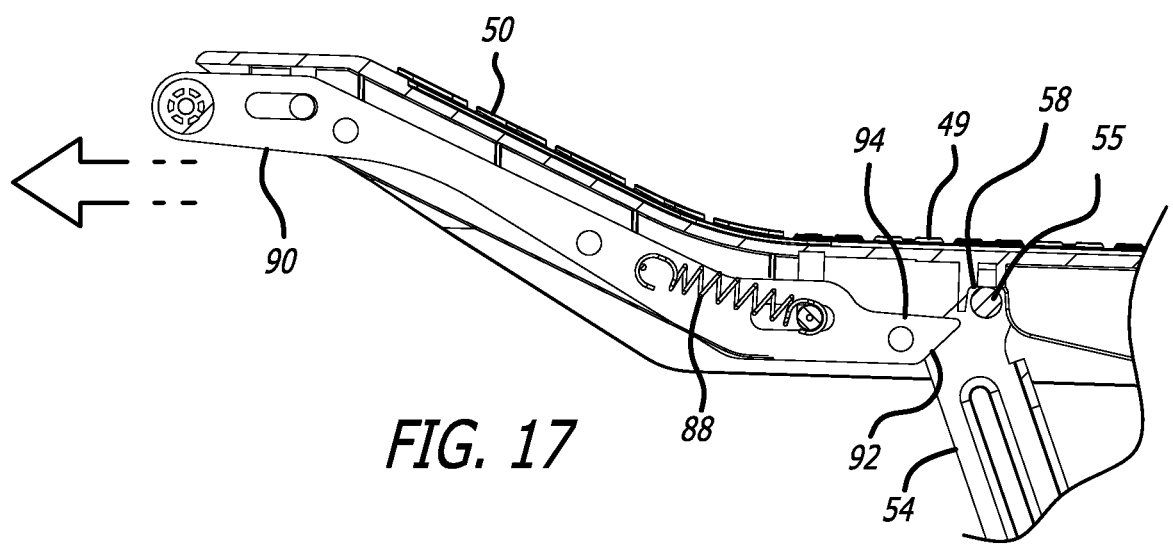
FIG. 17 is a cutaway right side view of area designated as 14 in FIG. 12, with slide lock bracket 90 in its unlocked position.

FIG. 17 is a cutaway right side view of area designated as 16 in FIG. 12, with slide lock bracket 90 in its unlocked position such that seat support bracket 54 can be disengaged from seat 49, and the scooter thus transformed back into the stand-on configuration.

Figure 20:
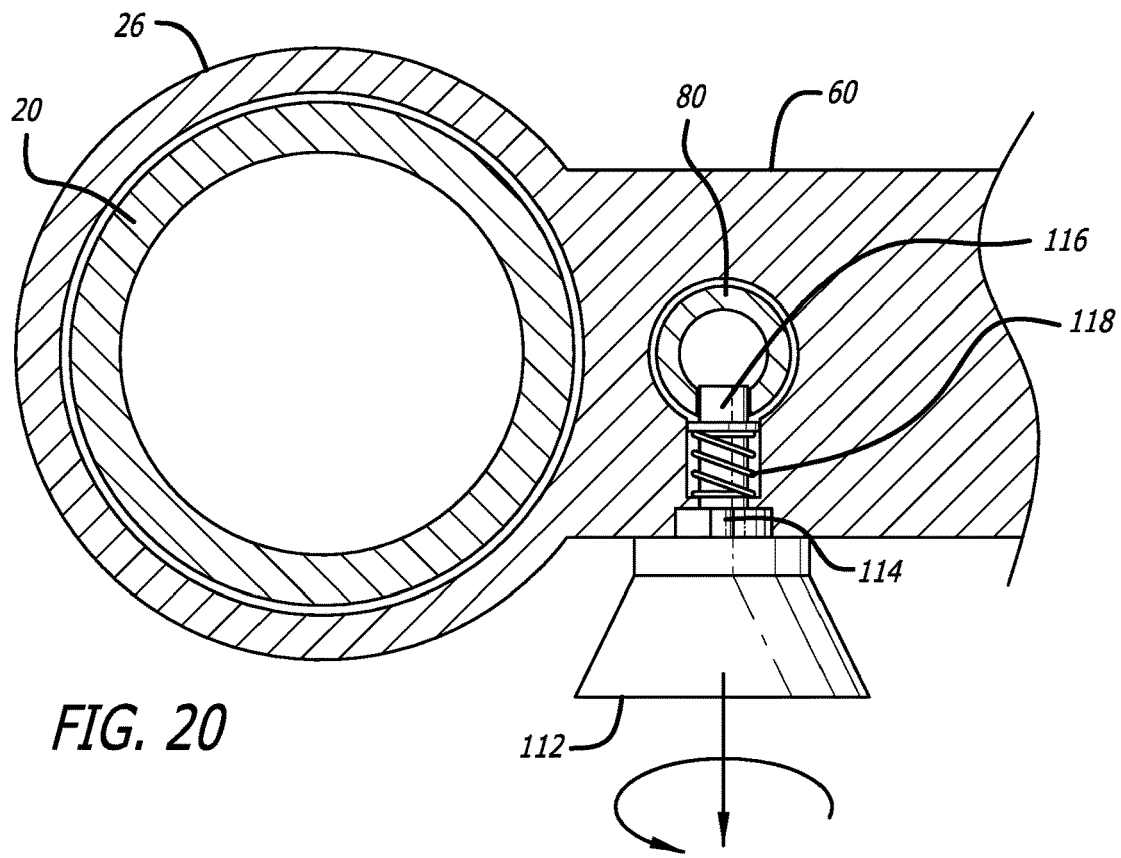
FIG. 20 is a sectional view of the mechanism of FIG. 18 taken along section line 20-20.

FIG. 18 is an oblique left side view of a secondary configuration lock according to a second embodiment, with the secondary lock in its locked position. FIG. 19 shows the same mechanism but in its unlocked position. The internal workings of this secondary configuration lock in the locked and unlocked state are shown in sectional views FIGS. 20 and 21, respectively.

Figure 11:
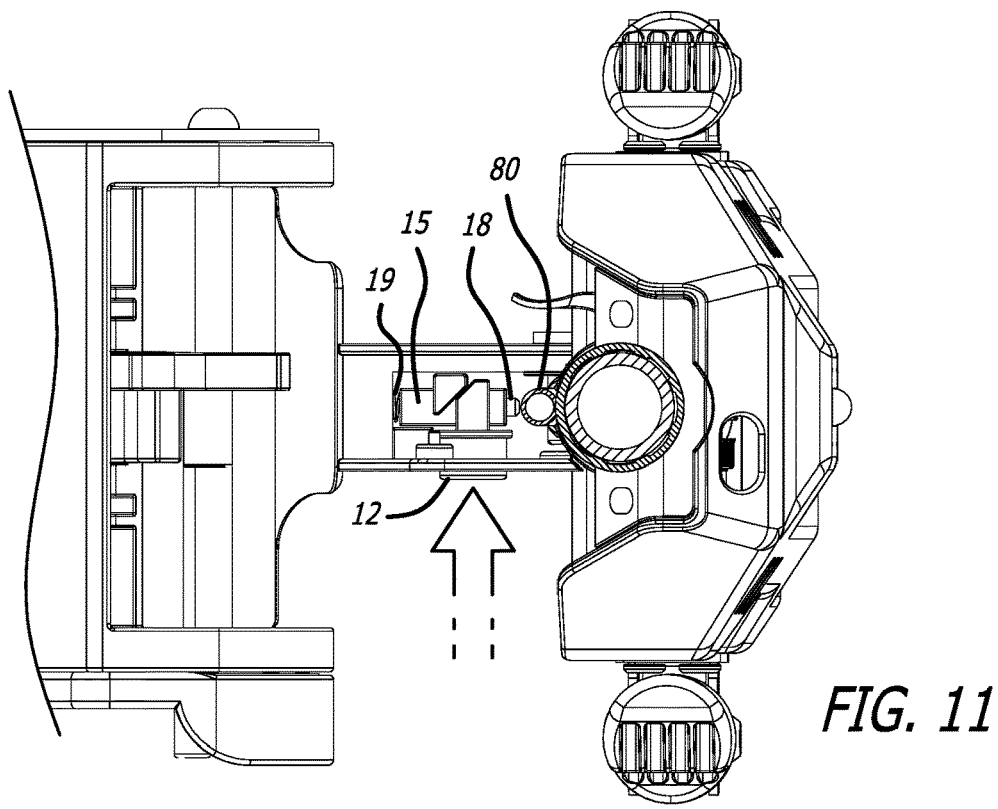
FIG. 11 is a top cutaway view of the transforming scooter of FIG. 8 showing details of the lock 11 which locks connector 60 to support rod 80, with the lock 11 in its unlocked configuration.
Figure 21:
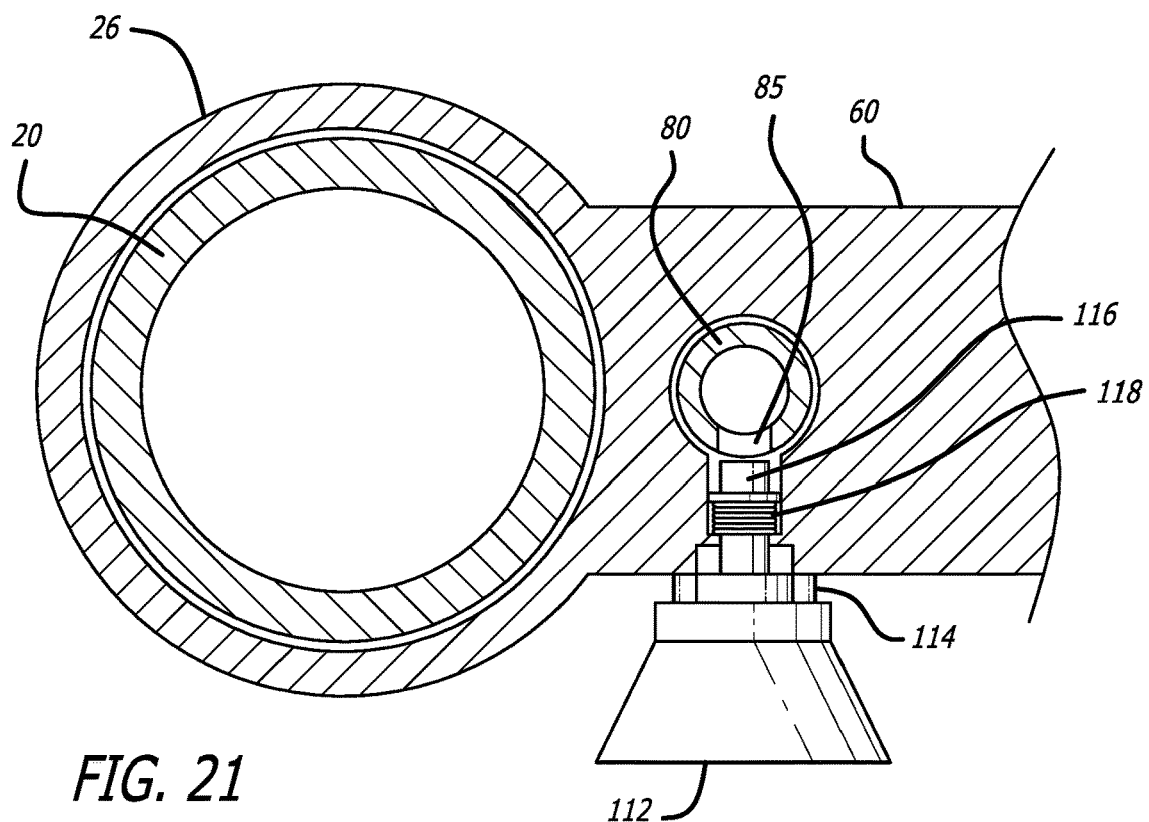
FIG. 21 is a sectional view of the mechanism of FIG. 19 taken along section line 21-21.

To unlock this secondary locking mechanism, the user pulls pull knob 112 against spring bias provided by spring 118, which pulls tab 114 on locking pin 116 through slot 113, and pulls locking pin 116 out of lower receiving hole 85 in support rod 80. This unlocks connector 60 from support rod 80 and hence fixed frame member 20. The user then rotates pull knob 112, thus rotating tab 114 so that cannot it cannot spring back through slot 113. This position is shown in FIGS. 19 and 21. In this position, the user can now press release knob 12 (FIGS. 8, 10, and 11) in order to slide connector 60 up or down fixed frame member 20 for transforming the scooter between its stand-on and its ride-on configurations. Once the connector 60 has been slid to its desired new position, the user releases pull knob 112. Thus user then rotates pull knob 112 until tab 114 lines up with, and travels into, slot 113 thus engaging the secondary configuration lock. Thus user can now use the scooter in its new configuration, confident that the redundant configuration locking mechanisms provided will keep the scooter securely in the selected configuration. This embodiment therefore provides both a first lock mechanism for which the user must press a first component, namely release button 12, in order to release the first lock mechanism, and must also pull a second component, namely pull knob 112, in order to release the second lock mechanism, in order to release the movable frame member 40 from the fixed frame member 20. This provides security against a user accidentally unlocking the movable frame member from the fixed frame member while using the scooter.

Figure 22:
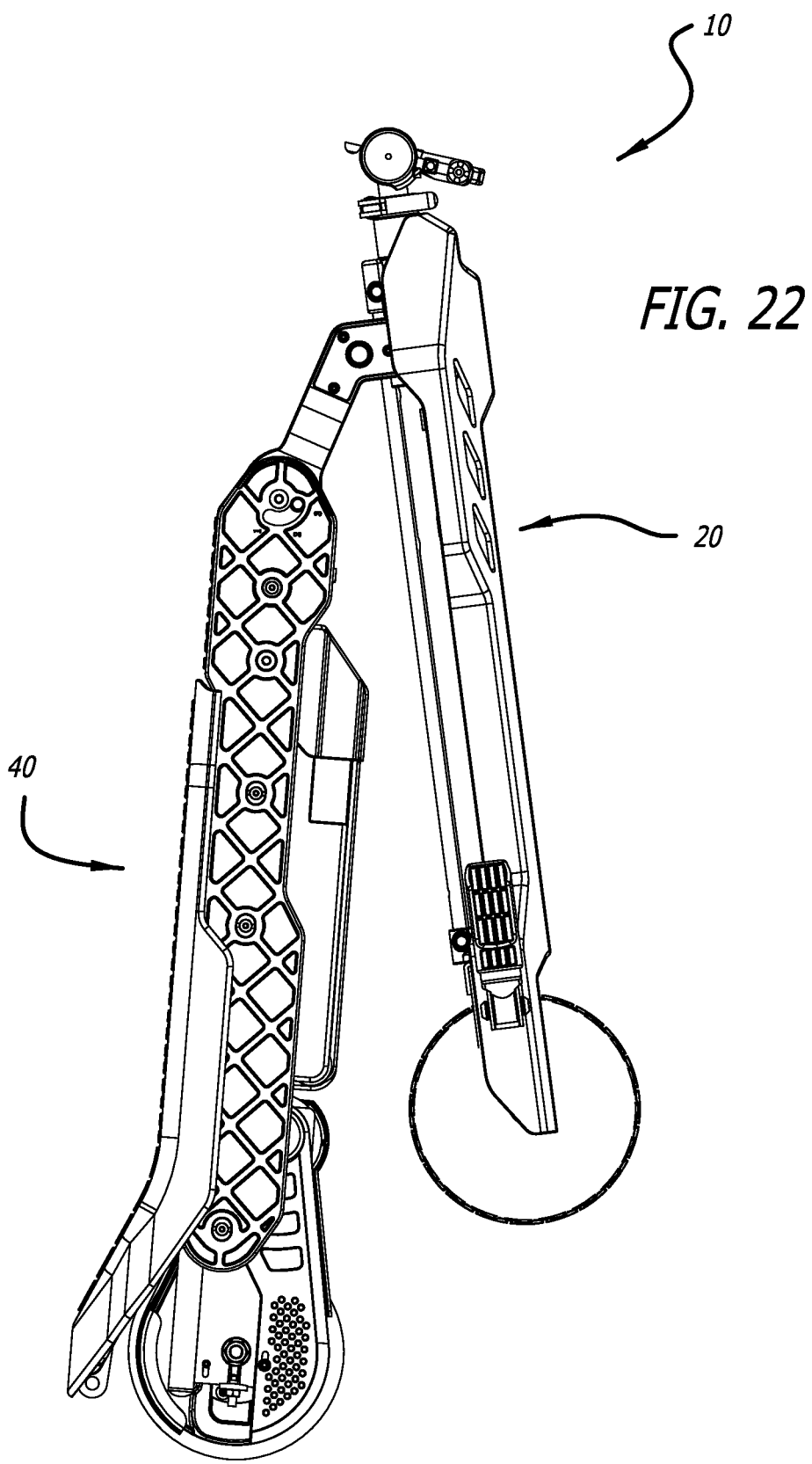
FIG. 22 is a side elevation view of the transforming scooter of FIG. 1 after it has been folded for storage or for being transported.

FIG. 22 shows scooter 10 in a third configuration, namely, a storage configuration. In this configuration the movable frame member 40 has been folded to a position that is close to, and nearly parallel with, fixed frame member 20. Additionally, steering column 32 has been telescoped all the way down.

In another embodiment, frame member 40 need not be slidable along head tube 21 and frame member 20, but could instead be releasably attached at each of two or more positions on head tube 21, such that it is a simple matter to release frame member 40 from its lower position on head tube 21 and reattach it at its upper position.

Variations are possible. The scooter need not be electric, but could be powered by a gasoline powered motor or other propulsion types. Different throttle and braking mechanisms, such as are well known in the art, could be used. Various types of electric motors could be used. The scooter could have more than two wheels. Instead of connector 60 being slidable along the steering head tube via a collar 26 that encircles the head tube 21, other sliding mechanisms are possible such as the connector 60 having a T-shaped piece that slides within a T-shaped slot that is mounted to the front frame member 20, or connector 60 could simply detach from front frame member 20 and reattach at either an upper position or a lower position on front frame member 20. Various locking mechanism that lock the movable frame member 40 to the front frame member 20 could be used. Other variations will be obvious to those of skill in the art.

An electric or other type of scooter than conveniently transforms between a stand-on configuration and a ride-on configuration has thus been disclosed. Furthermore, the scooter folds for compact storage when not in use.

It will be understood that the terms "generally," "approximately," "about," "substantially," "horizontal," and "vertical" as used within the specification and the claims herein allow for a certain amount of variation from any exact dimensions, measurements, and arrangements, and that those terms should be understood within the context of the description and operation of the invention as disclosed herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the scooter can be electrically powered or manually powered, although it is believed that the invention will have the greatest utility when applied to an electrically powered scooter.

Accordingly, it is to be understood that the detailed description and the accompanying drawings as set forth hereinabove are not intended to limit the breadth of the present invention, which should be inferred only from the following claims and their appropriately construed legal equivalents.

We claim:

1. A scooter that transforms between a stand-on configuration and a ride-on configuration, comprising:
a head tube;
a front wheel pivotally attached to the head tube;
a frame member, the frame member having a front portion and a rear portion;
a rear wheel attached to the frame member rear portion; and
a floorboard movably mounted to an upper side of the frame member to accommodate a user standing upon the floorboard when the scooter is in its stand-on configuration, and to accommodate the user sitting on the floorboard when the scooter is in its ride-on configuration; and
wherein the frame member front portion is movably mounted to the head tube such that the frame member front portion is positionable to at least two different vertical heights on the head tube;
wherein in the stand-on configuration:
the frame member front portion is attached at a position that defines a lower position on the head tube;
the frame member is substantially horizontal; and
the floorboard is substantially horizontal and accommodates a user standing thereon; and
wherein in the ride-on configuration:
the frame member front portion is attached at a position that defines an upper position on the head tube;
the frame member is downwardly inclined from its front portion to its rear portion; and
the floorboard extends generally horizontally away from the frame member and accommodates a user sitting thereon thereby functioning as a seat.

2. The transforming scooter of claim 1 wherein the term "generally horizontal" means an angle of less than 10 degrees from horizontal.

3. The transforming scooter of claim 1 wherein:
the frame member front portion is connected to the head tube by a collar that encircles the head tube.

4. The transforming scooter of claim 1 further comprising a support rod or tube that extends parallel to the head tube, and to which the frame member front portion lockingly engages.

5. The transforming scooter of claim 1 wherein:
the floorboard is hingedly connected to the frame member so as to pivot between a generally horizontal position when the frame member is generally horizontal defining a stand-on position of the floorboard, and a generally horizontal position when the frame member is in its downwardly inclined position defining a ride-on position of the floorboard; and
the floorboard locks with respect to the frame member in its ride-on position.

6. The transforming scooter of claim 1 further comprising a battery and a motor operatively connected to the rear wheel to provide power thereto in both the stand-on configuration and the ride-on configuration.

7. The transforming scooter of claim 1 further comprising:
a seat support bracket that is pivotally connected to one of the frame member and the floorboard, and which in a deployed position connects the floorboard to the frame member thereby providing vertical support to the floorboard when used by a rider as a seat.

8. The transforming scooter of claim 7 further comprising:
a spring-biased slide lock for releasably engaging the seat support bracket to the floorboard when the transforming scooter is in its ride-on configuration.

9. The transforming scooter of claim 1 further comprising a steering handle coupled to the front wheel;
a telescoping mechanism to allow the steering handle to be moved closer to and farther away from the front wheel, so that the steering handle may be raised and lowered to a comfortable level for the user when the scooter is both in its stand-on configuration and in its ride-on configuration.

10. The transforming scooter of claim 1 further comprising:
a pivoting mechanism such that the frame member can pivot relative to the head tube, allowing the frame member to be angled at each of approximately 75° relative to the head tube for the stand-on configuration, and approximately 60° relative to the head tube for the ride-on configuration.

11. A scooter that transforms between a stand-on configuration and a ride-on configuration, comprising:
a fixed and front frame member, the fixed frame member rotationally supporting a front wheel and a steering handle rotationally coupled to the front wheel;
a movable frame member, the movable frame member having a front end and a rear end, the front end of the movable frame member being fixable to the fixed frame member at both a first and lower position on the fixed frame member, and at a second and upper position thereon; and
a rear wheel attached proximate a rear end of the movable frame member;
wherein:
when the front end of the movable frame member is fixed at its lower position on the fixed frame member, the movable frame member is suitable for a user to stand on, the scooter thus being suitable for use as a stand-on scooter;
when the front end of the movable frame member is fixed at its upper position on the fixed frame member, a seat deploys from the movable frame member and locks in a deployed position, the seat being suitable for a user to sit upon, the scooter thus being suitable for use as a ride-on scooter.

12. The transforming scooter of claim 11 further comprising:
a connector that couples the movable frame member to the fixed frame member, the connector being rigidly coupled to the fixed frame member when coupled thereto; and
a pivot member that rotatably connects the connector to the movable frame member.

13. The transforming scooter of claim 11 wherein the seat at a rear portion thereof has an upwardly angled portion.

14. The transforming scooter of claim 11 wherein the seat deploying from the front end of the movable frame member comprises the seat folding out therefrom.

15. The transforming scooter of claim 11 wherein:
when the front end of the movable frame member is fixed at its lower position on the fixed frame member, the seat folds away from the lower position on the fixed frame member and locks, the seat being suitable for a user to stand at least partially upon, the scooter thus being suitable for use as a stand-on scooter.

16. The transforming scooter of claim 11 further comprising:
   left- and right-side footpegs pivotally mounted to the front frame member, the footpegs being suitable for use by a rider to rest his feet upon when the transforming scooter is in its ride on configuration.

17. A scooter that transforms between a stand-on configuration and a ride-on configuration, comprising:
   a first frame member;
   a front wheel connected to the first framer member;
   a steering handle connected to the first frame member, the steering handle being rotationally coupled to the front wheel thereby allowing a user to steer the front wheel via the steering handle;
   a second frame member, the second frame member being selectively coupled at a front end thereof to the first frame member at an upper position and at a lower position thereof;
   a rear wheel mounted to the second frame member; and
   a platform pivotally connected to the second frame member to fold away therefrom, the platform being suitable for:
      standing upon when the second frame member is coupled to the first frame member at said lower position and the platform is pivoted toward the second frame member, thereby defining the transforming scooter's stand-on configuration; and
      sitting upon when the second frame member is coupled to the first frame member at said upper position and the platform is pivoted away from the second frame member, thereby defining the transforming scooter's ride-on configuration.

18. The transforming scooter of claim 17 further comprising:
   a connector that couples the second frame member to the first frame member, the connector being rigidly coupled to the first frame member when coupled thereto; and
   a pivot member that rotatably connects the connector to the second frame member.

19. The transforming scooter of claim 17 wherein the second frame member is slidably coupled to the first frame member, and the scooter further comprises:
   a lock for selectively locking the second frame member to the first frame member at said upper and said lower position thereof.

20. The transforming scooter of claim 19 wherein said lock comprises:
   a first lock mechanism for which a user must press a first component in order to release the first lock mechanism; and
   a second lock mechanism for which a user must pull a second component in order to release the second lock mechanism;
   thereby providing security against a user accidentally unlocking the second frame member from the first frame member while using the transforming scooter.

* * * * *